United States Patent
Iwabuchi

(10) Patent No.: US 12,358,327 B2
(45) Date of Patent: Jul. 15, 2025

(54) TIRE

(71) Applicant: BRIDGESTONE CORPORATION, Tokyo (JP)

(72) Inventor: Sotaro Iwabuchi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/002,484

(22) PCT Filed: Jul. 8, 2021

(86) PCT No.: PCT/JP2021/025868
§ 371 (c)(1),
(2) Date: Dec. 20, 2022

(87) PCT Pub. No.: WO2022/014474
PCT Pub. Date: Jan. 20, 2022

(65) Prior Publication Data
US 2023/0241928 A1 Aug. 3, 2023

(30) Foreign Application Priority Data

Jul. 13, 2020 (JP) .................... 2020-120124

(51) Int. Cl.
*B60C 13/00* (2006.01)
(52) U.S. Cl.
CPC .................... *B60C 13/001* (2013.01)
(58) Field of Classification Search
CPC ........ B60C 13/00; B60C 13/001; B60C 13/02
USPC ......................... 152/523; D12/605
See application file for complete search history.

(56) References Cited

U.S. PATENT DOCUMENTS

| 6,253,815 | B1 | 7/2001 | Kemp et al. |
| 8,631,847 | B2 | 1/2014 | Nukushina |
| 9,975,203 | B2 | 5/2018 | Muhlhoff et al. |
| 10,596,858 | B2 | 3/2020 | Sotaro |
| 10,752,058 | B2 | 8/2020 | Iwabuchi |
| 2014/0216622 | A1* | 8/2014 | Muhlhoff .............. B29C 33/424 152/523 |

(Continued)

FOREIGN PATENT DOCUMENTS

| CN | 1286661 A | 3/2001 |
| CN | 102092245 A | 6/2011 |

(Continued)

OTHER PUBLICATIONS

Masamichi Wakamatsu, JP 08282215 A, updated machine translation. (Year: 1996).*

(Continued)

*Primary Examiner* — Sedef E Paquette
(74) *Attorney, Agent, or Firm* — KENJA IP LAW PC

(57) ABSTRACT

A tire according to the present disclosure includes, on the tire outer surface, a first region including an uneven surface formed by a convex portion arranged throughout the first region, and a second region including an uneven surface formed by a plurality of ridges arranged in parallel throughout the second region, the second region being arranged adjacent to the first region. The minimum separation distance between apices of the convex portion in the first region is shorter than the minimum separation distance between apices of two adjacent ridges in the second region.

9 Claims, 10 Drawing Sheets

(56) References Cited

U.S. PATENT DOCUMENTS

| | | | |
|---|---|---|---|
| 2014/0352864 A1* | 12/2014 | Miyasaka | B60C 13/001 152/524 |
| 2016/0137007 A1 | 5/2016 | Murata | |
| 2016/0361955 A1 | 12/2016 | Iwabuchi | |
| 2018/0126795 A1* | 5/2018 | Iwabuchi | B60C 13/02 |
| 2018/0141390 A1* | 5/2018 | Miyasaka | B60C 13/001 |
| 2020/0070591 A1* | 3/2020 | Debordeaux | B60C 13/001 |
| 2020/0391557 A1 | 12/2020 | Iwabuchi | |
| 2021/0039448 A1 | 2/2021 | Hoshiba et al. | |
| 2021/0094359 A1 | 4/2021 | Shinzawa et al. | |

FOREIGN PATENT DOCUMENTS

| | | |
|---|---|---|
| CN | 103596777 A | 2/2014 |
| CN | 103660806 A | 3/2014 |
| CN | 105246713 A | 1/2016 |
| CN | 106061760 A | 10/2016 |
| CN | 107614292 A | 1/2018 |
| EP | 1260387 A2 | 11/2002 |
| JP | H07164831 A | 6/1995 |
| JP | H08282215 A | 10/1996 |
| JP | 2002522294 A | 7/2002 |
| JP | 2016084041 A | 5/2016 |
| JP | 2019081514 A | 5/2019 |
| WO | 2016067855 A1 | 5/2016 |
| WO | 2019116937 A1 | 6/2019 |
| WO | 2019124253 A1 | 6/2019 |
| WO | 2019150929 A1 | 8/2019 |

OTHER PUBLICATIONS

Jan. 17, 2023, International Preliminary Report on Patentability issued in the International Patent Application No. PCT/JP2021/025868.

Nov. 20, 2023, search result of the Extended European Search Report issued by the European Patent Office in the corresponding European Patent Application No. 21842122.0.

Sep. 21, 2021, International Search Report issued in the International Patent Application No. PCT/JP2021/025868.

Aug. 14, 2024, search result of Office Action issued by the China National Intellectual Property Administration in the corresponding Chinese Patent Application No. 202180047610.5.

Dec. 11, 2024, search result of Office Action issued by the China National Intellectual Property Administration in the corresponding Chinese Patent Application No. 202180047610.5.

Mar. 21, 2025, search result of Office Action issued by the China National Intellectual Property Administration in the corresponding Chinese Patent Application No. 202180047610.5.

* cited by examiner

FIG. 10
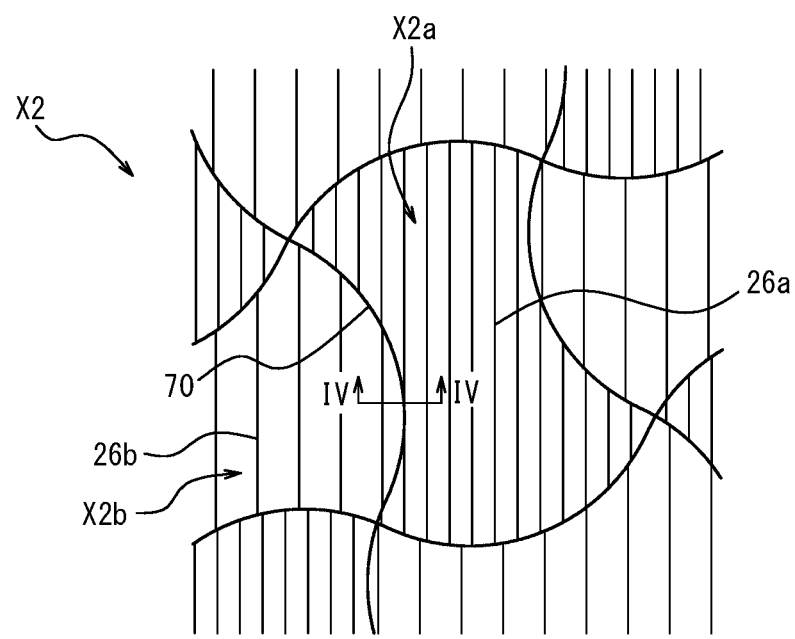
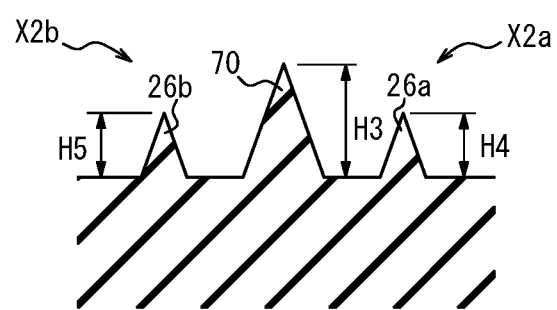

TIRE

TECHNICAL FIELD

The present disclosure relates to a tire.

BACKGROUND

Tires have conventionally been provided with letters, symbols, figures, patterns, and the like on the outer surface of the tire in a manner allowing identification from the outside. Patent literature (PTL) 1 describes this type of tire. The tire described in PTL 1 is provided with asymmetrical narrow stripes in a first portion, which is a portion surrounding letters, and in a second portion, which is a portion containing the letters.

CITATION LIST

Patent Literature

PTL 1: JP 2002-522294 A

SUMMARY

Technical Problem

The tire in PTL 1 is provided with the asymmetrical narrow stripes in the first and second portions to produce an optical contrast between the first and second portions at a plurality of viewing angles and illumination angles, thereby making the letters easier to read.

However, the tire in PTL 1 still has room for improvement in terms of making specific regions, such as the portion with letters, stand out even more.

It is an aim of the present disclosure to provide a tire capable of improving the visibility of a specific region on the outer surface of the tire.

Solution to Problem

A tire according to a first aspect of the present disclosure includes, on a tire outer surface, a first region including an uneven surface formed by a convex portion arranged throughout the first region, and a second region including an uneven surface formed by a plurality of ridges arranged in parallel throughout the second region, the second region being arranged adjacent to the first region, wherein a minimum separation distance between apices of the convex portion in the first region is shorter than a minimum separation distance between apices of two adjacent ridges in the second region.

Advantageous Effect

According to the present disclosure, a tire capable of improving the visibility of a specific region on the outer surface of the tire can be provided.

BRIEF DESCRIPTION OF THE DRAWINGS

In the accompanying drawings:

FIG. 10 is a diagram illustrating a configuration in which a ridge with a higher protrusion height than the ridges in each segmented region is provided at the boundary of a plurality of segmented regions in the second region illustrated in FIG. 9.

DETAILED DESCRIPTION

Embodiments of a tire according to the present disclosure are described below with reference to the drawings. Members, components, and directions that are common across drawings are labeled with the same reference signs.

Tires according to the present disclosure include both pneumatic tires and non-pneumatic tires. In the present embodiment, a pneumatic tire is described as an example of a tire according to the present disclosure.

Hereafter, unless otherwise noted, the dimensions, length relationships, positional relationships, and the like of each element are assumed to be measured in a reference state in which the pneumatic tire is mounted on an applicable rim, filled to a prescribed internal pressure, and under no load.

The "applicable rim" refers to a standard rim designated in the following standards in accordance with tire size ("Design Rim" in the YEAR BOOK of the Tire and Rim Association, Inc. (TRA), and "Measuring Rim" in the STANDARDS MANUAL of the European Tyre and Rim Technological Organisation (ETRTO)). The standards are determined according to an effective industrial standard in areas where the tire is produced or used. Examples of the standards include the YEAR BOOK of the TRA in the USA, the STANDARDS MANUAL of the ETRTO in Europe, and the JATMA YEAR BOOK of the Japan Automobile Tyre Manufacturers Association (JATMA) in Japan. The "applicable rim" includes sizes that could be included in the future in the aforementioned industrial standards, in addition to current sizes. Examples of the sizes that could be described in the future in the aforementioned industrial standards include the sizes described under FUTURE DEVELOPMENTS in the ETRTO 2013 edition. In the case of a size not listed in the aforementioned industrial standards, the "applicable rim" refers to a rim whose width corresponds to the bead width of the pneumatic tire.

The "prescribed internal pressure" refers to the air pressure (maximum air pressure) corresponding to the maximum load capability of a single wheel for the applicable size/ply rating in the aforementioned JATMA YEAR BOOK or the like. In the case of a size not described in the aforementioned industrial standards, the "prescribed internal pressure" refers to the air pressure (maximum air pressure) corresponding to the maximum load capability prescribed for each vehicle on which the tire is mounted. The "maximum load" described below refers to the tire maximum load capability specified in the aforementioned standards, such as JATMA, for tires of the applicable size, or in the case of sizes not specified in the aforementioned industrial standards, the "maximum load" refers to the load corresponding to the maximum load capability specified for each vehicle on which the tire is mounted.

Figure 1:
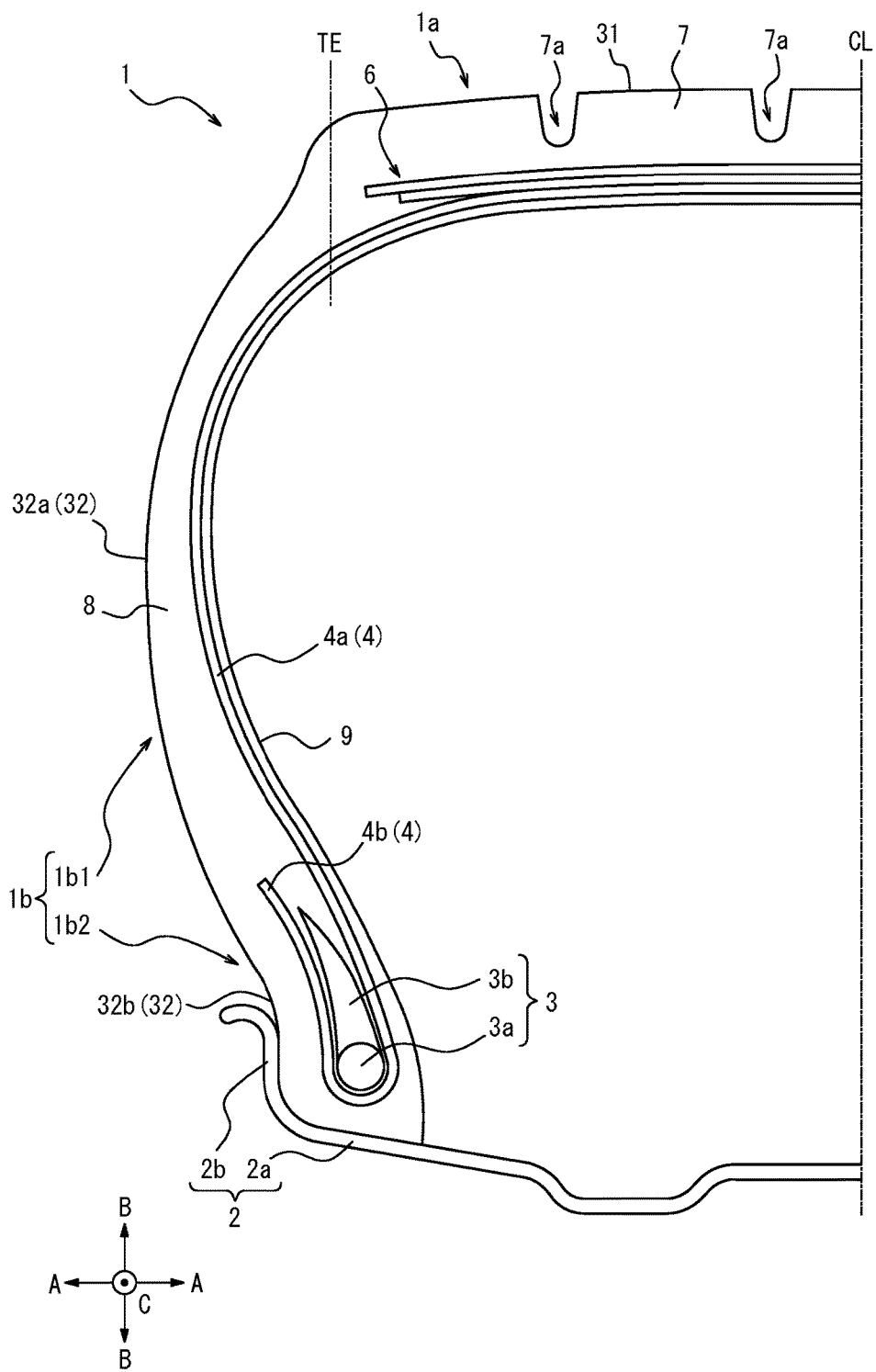
FIG. 1 is a cross-sectional view along a cross-section parallel to the tire width direction when a tire as an embodiment of the present disclosure is in a reference state.

FIG. 1 illustrates a pneumatic tire 1 (hereinafter simply referred to as "tire 1") as the present embodiment. Specifically, FIG. 1 is a cross-sectional view of the tire 1, in a cross-section parallel to a tire width direction A, in the reference state in which the tire 1 is mounted on an applicable rim 2, filled to the prescribed internal pressure, and under no load. Hereafter, this cross-section is referred to as the "tire widthwise cross-section". Since the tire 1 in the present embodiment has a symmetrical configuration with respect to the tire equatorial plane CL, FIG. 1 illustrates a tire widthwise cross-section on only one side of tire equatorial plane CL in the tire width direction A. However, the tire may have an asymmetrical configuration with respect to the tire equatorial plane CL.

<Applicable Rim 2>

The applicable rim 2 in the present embodiment illustrated in FIG. 1 includes a rim seat portion 2a, to which a bead member 3, described below, of the tire 1 is attached on the outside in a tire radial direction B, and a rim flange portion 2b protruding outward in the tire radial direction B from both ends of the rim seat portion 2a in the tire width direction A.

<Tire 1>

As illustrated in FIG. 1, the tire 1 includes a tread portion 1a and a pair of tire side portions 1b extending from both ends of the tread portion 1a in the tire width direction A inward in the tire radial direction B. The tire side portions 1b include a pair of sidewall portions 1b1 extending from both ends of the tread portion 1a in the tire width direction A inward in the tire radial direction B, and a pair of bead portions 1b2 provided at the inner ends of the sidewall portions 1b1 in the tire radial direction B. The tire 1 in the present embodiment is a tubeless passenger vehicle radial tire. Herein, the "tread portion 1a" refers to the portion sandwiched by tread edges TE on both sides in the tire width direction A. The "bead portion 1b2" refers to the portion in the tire radial direction B where the below-described bead member 3 is located. The "sidewall portion 1b1" refers to the portion between the tread portion 1a and the bead portion 1b2. The "tread edge TE" refers to the outermost position of the contact patch in the tire width direction when the tire is mounted on the above-described applicable rim, filled to the above-described prescribed internal pressure, and placed under the maximum load.

The tire outer surface is configured by a surface 31 on the outer side, in the tire radial direction B, of the tread portion 1a, which is the outer surface of the tread portion 1a (hereinafter referred to as the "tread outer surface 31"), and a surface 32 on the outer side, in the tire width direction A, of the tire side portion 1b, which is the outer surface of the tire side portion 1b (hereinafter referred to as the "tire side outer surface 32"). The tire side outer surface 32 includes a surface 32a on the outer side, in the tire width direction A, of the sidewall portion 1b1 (hereinafter referred to as the "sidewall outer surface 32a"), and a surface 32b on the outer side, in the tire width direction A, of the bead portion 1b2 (hereinafter referred to as the "bead outer surface 32b").

The tire 1 includes the bead member 3, a carcass 4, a belt 6, a tread rubber 7, a side rubber 8, and an inner liner 9.

[Bead Member 3]

The bead member 3 is embedded in the bead portion 1b2. The bead member 3 includes a bead core 3a and a rubber bead filler 3b located outward from the bead core 3a in the tire radial direction B. The bead core 3a includes a plurality of bead wires that are coated by rubber. The bead wires can, for example, be steel cords. The steel cords may, for example, be a monofilament of steel or may be formed by twisted wires.

[Carcass 4]

The carcass 4 extends toroidally to straddle the pair of bead portions 1b2, more specifically to straddle the bead cores 3a of the pair of bead members 3.

The carcass 4 is configured by one or more carcass plies (one in the present embodiment) with carcass cords arranged at an angle of, for example, 75° to 90° with respect to the tire circumferential direction C (see FIG. 1 and the like). This carcass ply includes a ply main body 4a located between the pair of bead cores 3a and ply folded-up portions 4b that are connected to both ends of the ply main body 4a and are formed to be folded up from the inside to the outside in the tire width direction A around the bead cores 3a. In the present embodiment, the bead filler 3b that is tapered outward in the tire radial direction B from the bead core 3a is disposed between the ply main body 4a and the ply folded-up portions 4b. The carcass cords of the carcass ply may, for example, be metallic cords, such as steel cords, or organic fiber cords made of polyester, nylon, rayon, aramid, or the like. The number of carcass plies may also be two or more.

[Belt 6]

The belt 6 includes one or more belt layers (two in the present embodiment) disposed outward in the tire radial direction B from a crown portion of the carcass 4. Each belt layer of the belt 6 in the present embodiment includes a belt cord coated with rubber. Each belt layer may be an inclined belt layer or a circumferential belt layer. The inclined belt layer is configured by a belt ply containing belt cords inclined and arranged at an angle greater than 10° and equal to or less than 40° relative to the tire circumferential direction C (see FIG. 1).

Also, the circumferential belt layer is configured by a belt ply containing belt cords arranged along the tire circumferential direction C (see FIG. 1) (at an angle of 10° or less, preferably 5° or less, relative to the tire circumferential direction C). The belt cords of each belt layer may, for example, be metallic cords, such as steel cords, or organic fiber cords made of polyester, nylon, rayon, aramid, or the like. Although the belt 6 in the present embodiment is configured by two belt layers, the belt 6 may be single-layered or may include three or more belt layers.

[Tread Rubber 7 and Side Rubber 8]

The tread rubber 7 forms the tread outer surface 31. A tread pattern including circumferential grooves 7a extending in the tire circumferential direction C (see FIG. 1 and the like), non-illustrated widthwise grooves extending in the tire width direction A, and the like is formed on the tread outer surface 31 in the present embodiment. The side rubber 8 forms the tire side outer surface 32 of the tire side portion 1b. Furthermore, the side rubber 8 is connected to the outer edge, in the tire width direction A, of the above-described tread rubber 7.

[Inner Liner 9]

The inner liner 9 is layered on the inner surface of carcass 4. The inner liner 9 can, for example, be formed from a butyl-based rubber having low air permeability. Butyl-based rubber refers to butyl rubber and butyl halide rubber, which is a derivative thereof.

Further features of the tire 1 are described next.

Figure 2:
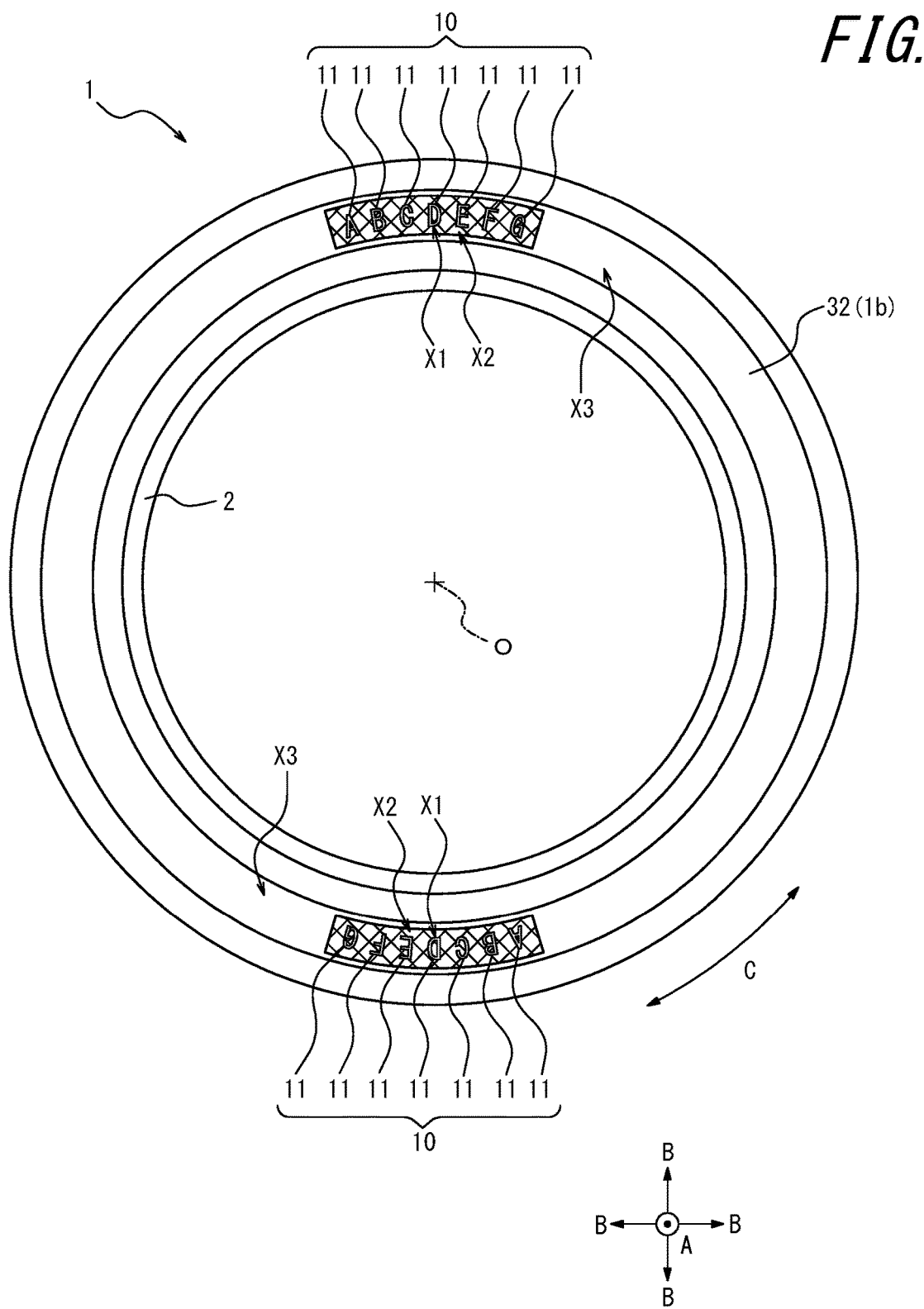
FIG. 2 is a side view of the tire illustrated in FIG. 1.
Figure 3:
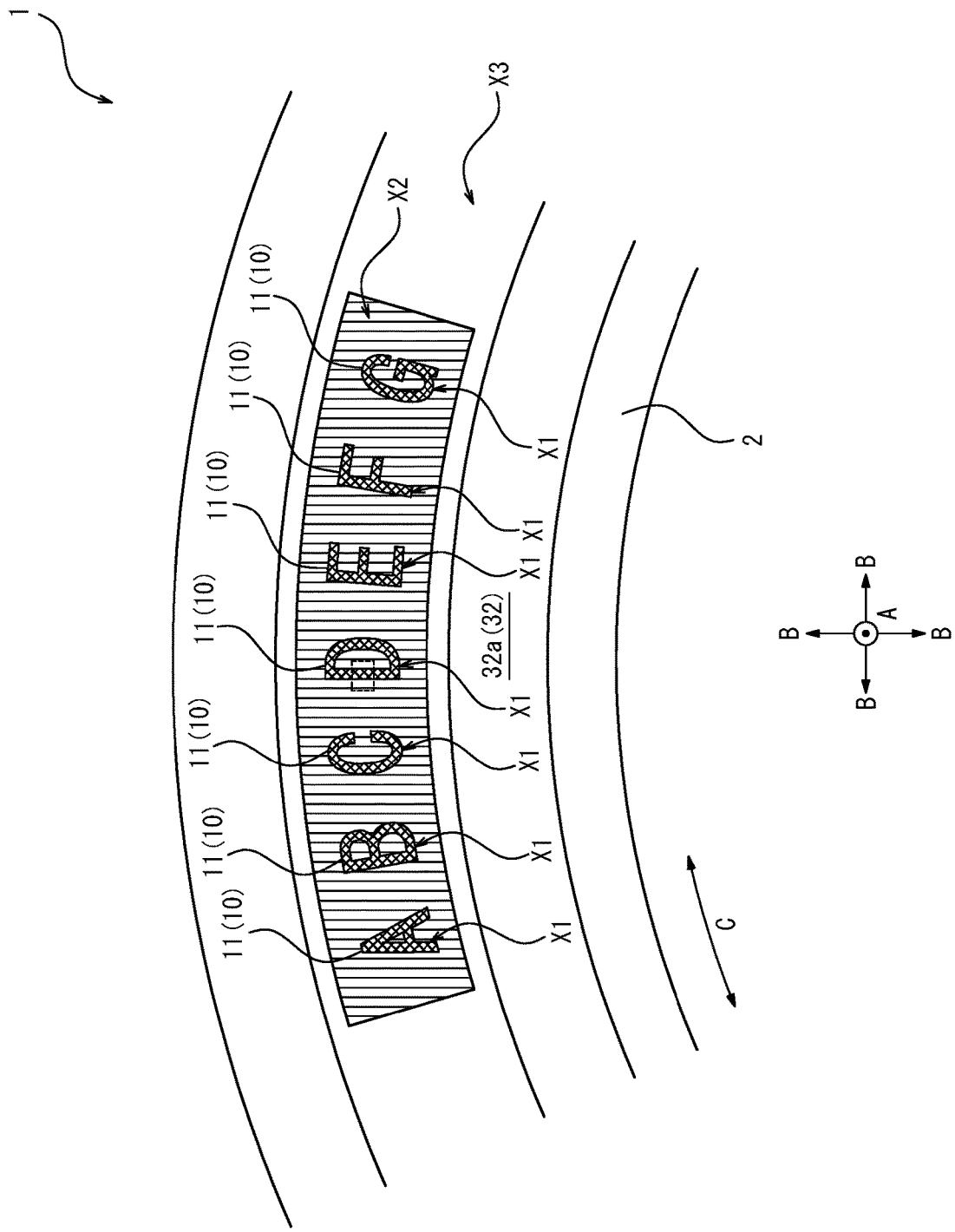
FIG. 3 is an enlarged view of a portion of FIG. 2.

FIG. 2 is a side view of the tire 1 in the above-described reference state. Specifically, FIG. 2 is a front view of the tire side portion 1*b* of the tire 1 in the reference state from the outside in the tire width direction A. FIG. 3 is an enlarged view of part of the tire in FIG. 2. As illustrated in FIGS. 2 and 3, a marking 10 including letters, symbols, figures, or patterns is formed on the tire side outer surface 32 of the tire outer surface of the tire 1. The marking 10 in the present embodiment is formed on the sidewall outer surface 32*a* of the tire side outer surface 32, but the marking 10 may be formed at another location on the tire outer surface. However, considering visibility from the outside and durability, the marking 10 is preferably applied to the tire side outer surface 32.

As illustrated in FIGS. 2 and 3, the marking 10 includes a plurality of marking elements 11 formed at different positions in the tire circumferential direction C on the tire side outer surface 32 of the tire outer surface.

Specifically, the marking 10 in the present embodiment is a letter marking consisting of only the seven letters "ABCDEFG". In other words, the marking 10 in the present embodiment includes the seven letters "A" through "G" as the plurality of marking elements 11. In addition to or instead of the letters as in the present embodiment, the marking may include a graphic, a bar code or other symbol, and/or a pattern.

The letters "A" through "G" as the plurality of marking elements 11 of the marking 10 in the present embodiment are formed at different positions in the tire circumferential direction C on the tire side outer surface 32. More specifically, the letters "A" through "G" as the plurality of marking elements 11 of the marking 10 in the present embodiment are formed at positions spaced apart in the tire circumferential direction C. A convex portion 50 (see FIG. 4) is arranged throughout a first region X1 where the marking elements 11 of the marking 10 in the present embodiment are each located. Also, a plurality of ridges 26 (see FIG. 4) as a type of convex portion are arranged in parallel throughout a second region X2 adjacent to each marking element 11 of the marking 10 in the present embodiment. Details are described below (see FIGS. 4 to 7).

In addition to the first region X1, the second region X2 in the present embodiment is also adjacent to a third region X3 formed by a flat, even surface. Specifically, the first region X1 in the present embodiment is surrounded by the second region X2. The second region X2 is then surrounded by the third region X3, which is a flat surface. In other words, the second region X2 in the present embodiment is adjacent to the first region X1 on the inside and adjacent to the third region X3 on the outside. A flat surface refers to a surface on which no unevenness is formed. The flat surface may be a planar or curved surface. The surface roughness of the flat surface is preferably 1 to 15 Rz (Rt).

As illustrated in FIG. 2, on the tire side outer surface 32 in the present embodiment, two markings 10 are provided at opposing positions in the tire radial direction B across a tire central axis O (see FIG. 2). In the present embodiment, separate second regions X2 are disposed at the positions of the two markings 10 on the tire side outer surface 32, but the second region X2 may be connected in a ring. There may also be other markings formed on the tire side outer surface 32 by unevenness or printing.

Figure 4:
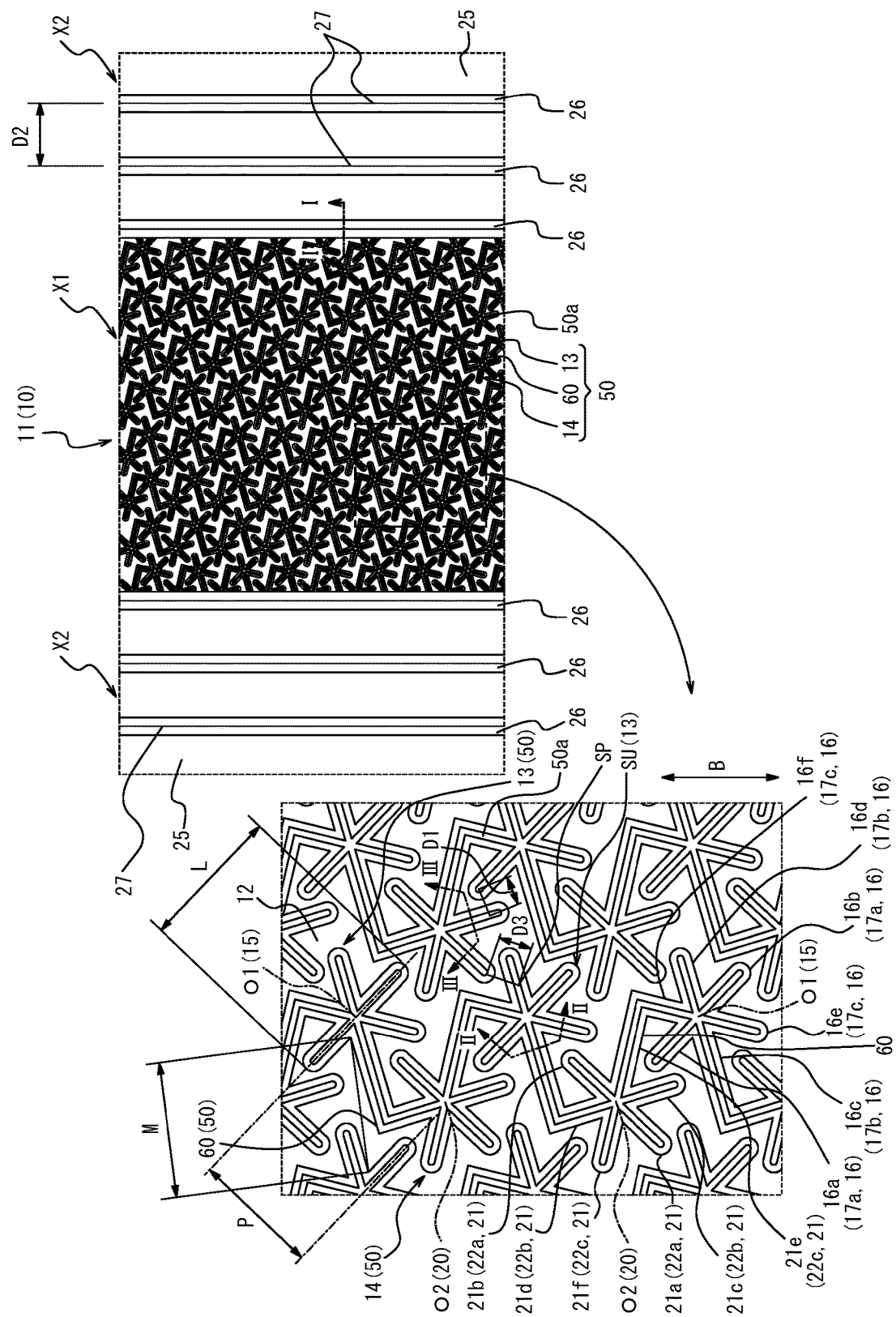
FIG. 4 is an enlarged view of the vicinity of a portion of the letter "D" in FIG. 3, and a further enlarged view of that portion.

Next, details of the first region X1 and second region X2 are explained. The right side of FIG. 4 is an enlarged view of the vicinity of a portion (within the dashed rectangular frame in FIG. 3) of the letter "D" as a marking element 11 in FIG. 3. The left side of FIG. 4 is a further enlarged view of the portion (within the dashed rectangular frame in the right side of FIG. 4) of the letter "D" in the right-hand figure in FIG. 4. As illustrated in FIG. 4, the first region X1 where the letter "D" as the marking element 11 is located has a convex portion 50 (see FIG. 4) arranged throughout the first region X1 to form an uneven surface. As illustrated in FIG. 4, the second region X2, where the letter "D" is located, includes an uneven surface formed by a plurality of ridges 26 (see FIG. 4) arranged in parallel throughout the second region X2. The letter "D" and its surroundings as the marking element 11 are illustrated as examples in FIG. 4, but the first regions X1 in which other letters are located and the surrounding second region X2 have the same configuration and are therefore not described here.

The first region X1 includes a base portion 12 and a convex portion 50 projecting from the base portion 12. The convex portion 50 in the present embodiment includes a unit pattern of a predetermined shape that is arranged repeatedly. The unit pattern in the present embodiment is repeatedly arranged at predetermined intervals. By using the unit pattern, the entire first region X1 can be easily filled regardless of the area of the first region X1. Specifically, the convex portion 50 in the present embodiment includes two unit patterns, i.e., a first unit pattern 13 and a second unit pattern 14. The convex portion 50 in the present embodiment further includes a connecting portion 60 that connects the first unit pattern 13 and the second unit pattern 14. As described in detail below, each of the first unit pattern 13 and the second unit pattern 14 in the present embodiment is configured as an asterisk including six extended portions that are extended in different directions from a relay point in plan view. Furthermore, as described in detail below, a portion of the extended portions of the first unit pattern 13 and the second unit pattern 14 in the present embodiment are connected to each other via the connecting portion 60.

The base portion 12 forms a reference plane for each marking element 11. The first unit pattern 13, second unit pattern 14, and the connecting portion 60 project from the base portion 12 as a reference.

The first unit pattern 13 includes extended portions 16 that project from the base portion 12 and are extended in a plurality of directions from a relay point 15 in plan view. Specifically, the first unit pattern 13 in the present embodiment is configured by the above-described asterisk projection. The asterisk projection as the first unit pattern 13 in the present embodiment includes the extended portions 16 that are identically shaped and are linearly extended from a center point O1 as the relay point 15 in different directions. More specifically, the asterisk projection as the first unit pattern 13 in the present embodiment includes a first extended portion 16*a*, a second extended portion 16*b*, a third extended portion 16*c*, a fourth extended portion 16*d*, a fifth extended portion 16*e*, and a sixth extended portion 16*f* as six extended portions 16 extending in different directions from the center point O1 as the relay point 15. Hereafter, when no distinction is made among the six extended portions 16, they are referred to simply as the "extended portions 16".

As illustrated in FIG. 4, the first extended portion 16*a* and the second extended portion 16*b* are extended in opposite directions from the center point O1 as the relay point 15, and a shape extending continuously in a straight line is formed by the first extended portion 16*a* and the second extended portion 16*b*. For the sake of convenience, the first extended portion 16*a* and the second extended portion 16*b* are hereinafter collectively referred to as a "first straight portion 17*a*".

As illustrated in FIG. 4, the third extended portion 16*c* and the fourth extended portion 16*d* are extended in opposite directions from the center point O1 as the relay point 15, and a shape extending continuously in a straight line is formed by the third extended portion 16c and the fourth extended portion 16d. For the sake of convenience, the third extended portion 16c and the fourth extended portion 16d are hereinafter collectively referred to as a "second straight portion 17b".

As illustrated in FIG. 4, the fifth extended portion 16e and the sixth extended portion 16f are extended in opposite directions from the center point O1 as the relay point 15, and a shape extending continuously in a straight line is formed by the fifth extended portion 16e and the sixth extended portion 16f. For the sake of convenience, the fifth extended portion 16e and the sixth extended portion 16f are hereinafter collectively referred to as a "third straight portion 17c".

In this way, the asterisk projection as the first unit pattern 13 in the present embodiment is configured by the first straight portion 17a, the second straight portion 17b, and the third straight portion 17c, which intersect at the center point O1 as the relay point 15.

Among the six extended portions 16, a 60° angle is formed between adjacent extended portions 16. In other words, the six extended portions 16 extend radially from the center point O1 as the relay point 15.

Figure 5:
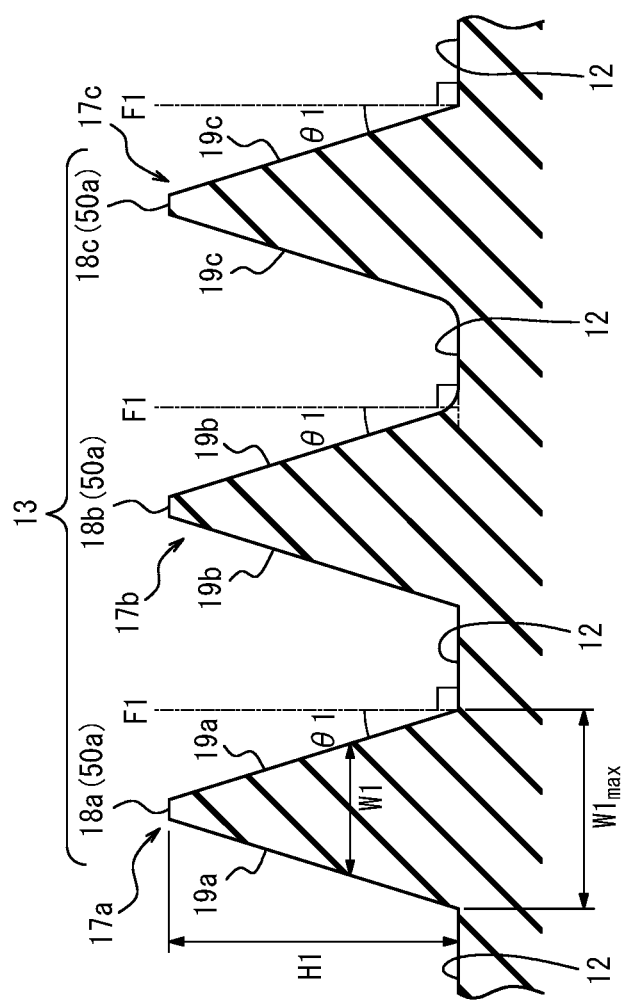
FIG. 5 is a cross-sectional view along cross-section II-II of FIG. 4.

FIG. 5 is a diagram illustrating a cross-section orthogonal to the extending direction of the first straight portion 17a, the second straight portion 17b, and the third straight portion 17c of the first unit pattern 13 in the present embodiment. Specifically, FIG. 5 is a cross-sectional view along cross-section II-II of FIG. 4. As illustrated in FIG. 5, in the asterisk projection as the first unit pattern 13, the first straight portion 17a, the second straight portion 17b, and the third straight portion 17c are substantially isosceles triangles with flat apices. The apex of the first straight portion 17a is hereinafter referred to as a "first apex 18a", the apex of the second straight portion 17b as a "second apex 18b", and the apex of the third straight portion 17c as a "third apex 18c".

The height from the base portion 12 to each of the first apex 18a, the second apex 18b, and the third apex 18c (hereinafter referred to as the "projection height H1") is 0.1 mm or more and 1.0 mm or less. The projection height H1 is more preferably set within a range of 0.2 mm or more and 0.8 mm or less.

As illustrated in FIG. 5, in the asterisk projection as the first unit pattern 13 in the present embodiment, the base portion 12 between the first straight portion 17a and the second straight portion 17b is flat. As illustrated in FIG. 5, the base portion 12 between the second straight portion 17b and the third straight portion 17c is curved. By making the base portion 12 curved, the reflection of incident light is suppressed, and the contrast with the outside of the marking element 11 is increased, thereby improving visibility.

At first sidewall surfaces 19a forming the legs of the isosceles triangle of the first straight portion 17a, second sidewall surfaces 19b forming the legs of the isosceles triangle of the second straight portion 17b, and third sidewall surfaces 19c forming the legs of the isosceles triangle of the third straight portion 17c, a width W1, which is the distance between the sidewall surfaces, grows wider from the apex side towards the base portion 12 in a cross-sectional view (see FIG. 5) orthogonal to the respective extending directions of the first straight portion 17a to the third straight portion 17c. The first sidewall surfaces 19a, the second sidewall surfaces 19b, and the third sidewall surfaces 19c form an angle θ1 with respect to a virtual vertical plane F1 relative to the base portion 12. The angle θ1 is preferably in the range of 5° to 30°, more preferably in the range of 15° to 25°. When the angle θ1 is greater than 30°, a greater proportion of the reflected light at the first sidewall surface 19a to the third sidewall surface 19c returns outward from between the extended portions 16, resulting in less improvement in visibility. In other words, light is reflected, and the difference in contrast with the outside of the marking element 11 becomes smaller, resulting in less improvement in visibility of the marking element 11. On the other hand, when the angle θ1 is smaller than 5°, the extended portions 16 more easily collapse. Therefore, considering the effect of preventing the reflected light that is incident between the extended portions 16 from returning outward from between the extended portions 16 and the durability of the extended portions 16, the angle θ1 is referably from 5° to 30°.

In the extended portion 16, the projection height H1 is preferably 0.8 to 6 times the maximum width W1max (distance between the bases of the sidewall surfaces at the base portion 12) at the base of the isosceles triangle. When the projection height H1 is less than 0.8 times the maximum width W1max, a greater proportion of the reflected light at the first sidewall surface 19a to the third sidewall surface 19c returns outward from between the extended portions 16, resulting in less improvement in visibility. In other words, light is reflected, and the difference in contrast with the outside of the marking element 11 becomes smaller, resulting in less improvement in visibility. On the other hand, when the projection height H1 is more than 6 times the maximum width W1max, the first sidewall surface 19a to the third sidewall surface 19c reach an angle nearly perpendicular to the base portion 12, making the extended portions 16 more easily collapse. Therefore, considering the effect of preventing the reflected light that is incident between the extended portions 16 from returning outward from between the extended portions 16 and the durability of the extended portions 16, the projection height H1 is preferably 0.8 to 6 times the maximum width W1max, which is the base length.

The second unit pattern 14 in the present embodiment includes extended portions 21 that project from the base portion 12 and are extended in a plurality of directions from a relay point 20 in plan view. In the second unit pattern 14 in the present embodiment, an asterisk projection having the same shape and size as the first unit pattern 13 is inclined at a different angle from the asterisk projection as the first unit pattern 13 in a side view of the tire (see FIGS. 2 to 4). Specifically, as illustrated in FIG. 4, the asterisk projection as the second unit pattern 14 is inclined at an angle yielded by rotating the asterisk projection as the first unit pattern 13 by 30° around the center point O1.

Specifically, the asterisk projection as the second unit pattern 14 in the present embodiment includes the extended portions 21 that are identically shaped and are linearly extended from a center point O2 as the relay point 20 in different directions. More specifically, the asterisk projection as the second unit pattern 14 in the present embodiment includes a first extended portion 21a, a second extended portion 21b, a third extended portion 21c, a fourth extended portion 21d, a fifth extended portion 21e, an sixth extended portion 21f as six extended portions 21 extending in different directions from the center point O2 as the relay point 20. Hereafter, when no distinction is made among the six extended portions 21, they are referred to simply as the "extended portions 21".

As illustrated in FIG. 4, the first extended portion 21a and the second extended portion 21b are extended in opposite directions from the center point O2 as the relay point 20, and a shape extending continuously in a straight line is formed by the first extended portion 21a and the second extended portion 21b. For the sake of convenience, the first extended portion 21a and the second extended portion 21b are hereinafter collectively referred to as a "first straight portion 22a".

As illustrated in FIG. 4, the third extended portion 21c and the fourth extended portion 21d are extended in opposite directions from the center point O2 as the relay point 20, and a shape extending continuously in a straight line is formed by the third extended portion 21c and the fourth extended portion 21d. For the sake of convenience, the third extended portion 21c and the fourth extended portion 21d are hereinafter collectively referred to as a "second straight portion 22b".

As illustrated in FIG. 4, the fifth extended portion 21e and the sixth extended portion 21f are extended in opposite directions from the center point O2 as the relay point 20, and a shape extending continuously in a straight line is formed by the fifth extended portion 21e and the sixth extended portion 21f. For the sake of convenience, the fifth extended portion 21e and the sixth extended portion 21f are hereinafter collectively referred to as a "third straight portion 22c".

In this way, the asterisk projection as the second unit pattern 14 in the present embodiment is configured by the first straight portion 22a, the second straight portion 22b, and the third straight portion 22c, which intersect at the center point O2 as the relay point 20.

Among the six extended portions 21, a 60° angle is formed between adjacent extended portions 21. In other words, the six extended portions 21 extend radially from the center point O2 as the relay point 20.

Figure 6:
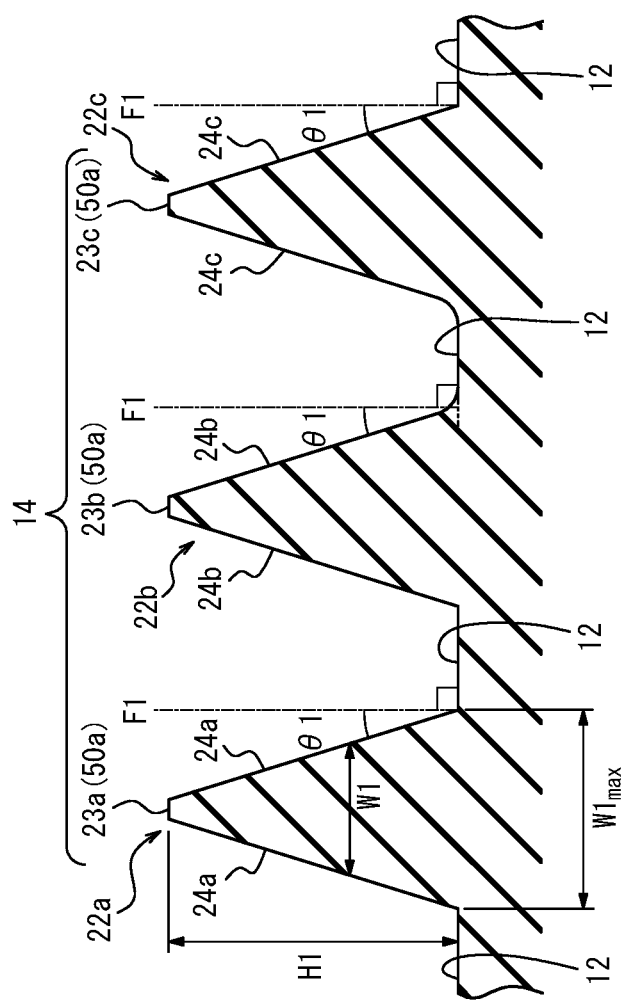
FIG. 6 is a cross-sectional view along cross-section of FIG. 4.

FIG. 6 is a diagram illustrating a cross-section orthogonal to the extending direction of the first straight portion 22a, the second straight portion 22b, and the third straight portion 22c of the second unit pattern 14 in the present embodiment. Specifically, FIG. 6 is a cross-sectional view along cross-section of FIG. 4. As illustrated in FIG. 6, in the asterisk projection as the second unit pattern 14, the first straight portion 22a, the second straight portion 22b, and the third straight portion 22c are substantially isosceles triangles with flat apices. The apex of the first straight portion 22a is hereinafter referred to as a "first apex 23a", the apex of the second straight portion 22b as a "second apex 23b", and the apex of the third straight portion 22c as a "third apex 23c".

The projection height H1, which is the height from the base portion 12 to each of the first apex 23a, the second apex 23b, and the third apex 23c, is 0.1 mm or more and 1.0 mm or less, like the projection height H1 in the first unit pattern 13. The projection height H1 is more preferably set within a range of 0.2 mm or more and 0.8 mm or less.

As illustrated in FIG. 6, in the asterisk projection as the second unit pattern 14 in the present embodiment, the base portion 12 between the first straight portion 22a and the second straight portion 22b is flat.

As illustrated in FIG. 6, the base portion 12 between the second straight portion 22b and the third straight portion 22c is curved. By making the base portion 12 curved, the reflection of incident light is suppressed, and the contrast with the outside of the marking element 11 is increased, thereby improving visibility.

First sidewall surfaces 24a forming the legs of the isosceles triangle of the first straight portion 22a, second sidewall surfaces 24b forming the legs of the isosceles triangle of the second straight portion 22b, and third sidewall surfaces 24c forming the legs of the isosceles triangle of the third straight portion 22c are configured so that a width W1, which is the distance between the sidewall surfaces, grows wider from the apex side towards the base portion 12 in a cross-sectional view (see FIG. 6) orthogonal to the respective extending directions of the first straight portion 22a to the third straight portion 22c. The first sidewall surfaces 24a, the second sidewall surfaces 24b, and the third sidewall surfaces 24c form an angle θ1 with respect to a virtual vertical plane F1 relative to the base portion 12. The angle θ1 is preferably in the range of 5° to 30°, more preferably in the range of 15° to 25°, for the same reasons as the angle θ1 in the first unit pattern 13.

In the extended portion 21, the projection height H1 is preferably 0.8 to 6 times the maximum width W1max (distance between the bases of the sidewall surfaces at the base portion 12) at the base of the isosceles triangle for the same reasons as the projection height H1 in the first unit pattern 13.

As illustrated in FIG. 4, the first unit pattern 13 and the second unit pattern 14 described above are arranged so as to fill in the entire first region X1, which is the location of the marking elements 11.

Specifically, a plurality of the first unit patterns 13 is arranged along the tire radial direction B (at an angle of 10° or less with respect to the tire radial direction B) for each marking element 11 in the present embodiment. A plurality of the second unit patterns 14 is also arranged along the tire radial direction B (at an angle of 10° or less with respect to the tire radial direction B) for each marking element 11 in the present embodiment.

Furthermore, a plurality of the first unit patterns 13 is arranged in a direction substantially orthogonal to the tire radial direction B for each marking element 11 in the present embodiment. A plurality of the second unit patterns 14 is also arranged in a direction substantially orthogonal to the tire radial direction B for each marking element 11 in the present embodiment.

By the first unit pattern 13 and the second unit pattern 14 thus being arranged regularly in a predetermined direction, the arrangement of the first unit pattern 13 and the second unit pattern 14 can be simplified, even if the first unit pattern 13 and the second unit pattern 14 are not anisotropic. The configuration of the present embodiment is not limiting, and in the case of using non-anisotropic unit patterns, a repeating pattern formed by regularly arranging unit patterns is preferably used. In this way, a large area can be easily filled with unit patterns even when non-anisotropic unit patterns are used.

As illustrated at the left side of FIG. 4, the tip of the first extended portion 16a of the asterisk projection as the first unit pattern 13 is positioned to be sandwiched between the third extended portion 21c and the fifth extended portion 21e of the asterisk projection as the adjacent second unit pattern 14. The tip of the second extended portion 16b of the asterisk projection as the first unit pattern 13 is positioned to be sandwiched between the fourth extended portion 21d and the sixth extended portion 21f of the asterisk projection as the adjacent second unit pattern 14.

As also illustrated at the left side of FIG. 4, the tip of the first extended portion 21a of the asterisk projection as the second unit pattern 14 is positioned to be sandwiched between the fourth extended portion 16d and the sixth extended portion 16f of the asterisk projection as the adjacent first unit pattern 13. Furthermore, the tip of the second extended portion 21b of the asterisk projection as the second unit pattern 14 is positioned to be sandwiched between the third extended portion 16c and the fifth extended portion 16e of the asterisk projection as the adjacent first unit pattern 13.

The interval between the center point O1 as the relay point 15 and the center point O2 as the relay point 20 (hereinafter referred to as "interval P") in the adjacent first unit pattern 13 and second unit pattern 14 is 0.2 mm or more and 3.0 mm or less. In the first unit pattern 13, the length from the tip of the first extended portion 16a to the tip of the second extended portion 16b, the length from the tip of the third extended portion 16c to the tip of the fourth extended portion 16d, and the length from the tip of the fifth extended portion 16e to the tip of the sixth extended portion 16f are equivalent and are the longest length of the first unit pattern 13 in the side view of the tire. This length is hereinafter referred to as the "linear extending length L". The linear extending length L is set longer than the interval P.

The length from the tip of the first extended portion 21a to the tip of the second extended portion 21b, the length from the tip of the third extended portion 21c to the tip of the fourth extended portion 21d, and the length from the tip of the fifth extended portion 21e to the tip of the sixth extended portion 21f are the longest length of the second unit pattern 14 in the side view of the tire and are the same as the linear extending length L of the first unit pattern 13.

If the above-described interval P is less than 0.2 mm, the length of the extended portions 16, 21 becomes shorter, making it difficult to ensure the formability of the first unit pattern 13 and the second unit pattern 14 during manufacturing. On the other hand, if the interval P exceeds 3.0 mm, the effect of reflected light at the base portion 12 becomes significant, making it difficult to for the first unit pattern 13 and the second unit pattern 14 to form a contrast with the surrounding area. The first unit pattern 13 and the second unit pattern 14 are densely arranged so that the effect of reflected light on the base portion 12 is reduced, and the interval P is 1.0 mm or less, more preferably 0.8 mm or less. In this way, the reflected light from the base portion 12 can be further reduced, making the marking element 11 appear darker and increasing the contrast of the marking element 11 against its surroundings to improve the visibility of the marking element 11. However, the adjacent first unit pattern 13 and second unit pattern 14 are arranged at a distance from each other, without being continuous, in the portions not connected by the connecting portion 60, described below.

The marking element 11 in the present embodiment includes the first unit pattern 13 and the second unit pattern 14, but the marking element 11 may be configured to have a plurality of only one unit pattern formed on the base portion 12. However, as in the present embodiment, the use of multiple types of unit patterns makes it easier to densely arrange the unit patterns for a reduction in the area of the base portion 12. It thus becomes easier to achieve a more visible marking element 11.

Although each of the first unit pattern 13 and the second unit pattern 14 in the present embodiment is configured by an asterisk projection, the number of extended portions extended in different directions from the relay point is not limited to six. It suffices for the number to be two or more, though three or more is preferable.

Provision of a plurality of extended portions facilitates dense arrangement of the unit patterns, so that the area of the base portion 12 is reduced.

The connecting portion 60 in the present embodiment connects the adjacent first unit pattern 13 and second unit pattern 14. In the present embodiment, any first unit pattern 13 is connected to at least one adjacent second unit pattern 14 via the connecting portion 60. More specifically, in the present embodiment, the sixth extended portion 16f of any first unit pattern 13 is connected to the fifth extended portion 21e of the adjacent second unit pattern 14 by the connecting portion 60. Furthermore, in the present embodiment, the third extended portion 16c of any first unit pattern 13 is connected to the fourth extended portion 21d of the adjacent second unit pattern 14 by the connecting portion 60. However, the extended portions 16 of the first unit pattern 13 and the extended portions 21 of the second unit pattern 14 that are connected by the connecting portions 60 are not limited to the configuration of the present embodiment, and other extended portions 16, 21 may be connected to each other.

The connecting portion 60 in the present embodiment has a linear configuration formed by extending one extended portion 16 of the first unit pattern 13 or one extended portion 21 of the second unit pattern 14. However, the connecting portion 60 may have a bent configuration that is formed by extending and connecting one extended portion 16 of the first unit pattern 13 and one extended portion 21 of the second unit pattern 14 and that is bent at a predetermined angle, such as 90°. The connecting portion 60 is not limited to a straight or bent shape but may also be configured to curve in an arc shape, for example.

The plurality of first unit patterns 13 arranged along the tire radial direction B are continuous via the connecting portions 60 and the second unit patterns 14 connected by the connecting portions 60. In other words, the plurality of second unit patterns 14 arranged along the tire radial direction B are continuous via the connecting portions 60 and the first unit patterns 13 connected by the connecting portions 60. That is, the first unit patterns 13 and the second unit patterns 14 are connected by the connecting portions 60 to be zigzag-shaped in the tire radial direction B. The first unit pattern 13 and the second unit pattern 14 are continuous from one end on the inner side to the other end on the outer side in the tire radial direction B.

By provision of the connecting portions 60, the first unit patterns 13 and the second unit patterns 14 are connected, the first unit patterns 13 and the second unit patterns 14 can support each other, collapsing of each unit pattern in the first unit patterns 13 and the second unit patterns 14 can be suppressed, and the durability of each unit pattern can be improved.

In addition, by the first unit pattern 13 and the second unit pattern 14 being connected in a straight line (the tire radial direction B in the present embodiment) as with the connecting portion 60 in the present embodiment, the rubber flow property can be improved during vulcanization molding of the tire 1 using a mold as compared to a configuration in which adjacent first unit patterns 13 and second unit patterns 14 are connected in different directions by connecting portions at irregular positions, with no portion connected in a straight line. In other words, connecting grooves on the inner surface of the mold, which are the corresponding shapes of the first unit pattern 13, the second unit pattern 14, and the connecting portion 60, allow air to escape to the outside of the marking elements 11 during vulcanization molding. Therefore, air tends not to accumulate in the mold during vulcanization molding, which improves the rubber flow property and reduces the occurrence of defective products.

In addition, in each of the marking elements 11 in the present embodiment, the adjacent first unit patterns 13 and second unit patterns 14 are regularly connected in a predetermined direction by the connecting portions 60, making it difficult for the shades of black within each marking element 11 to vary, so that each marking element 11 appears uniformly black. However, in terms of visibility alone, the convex portion 50 need not include the connecting portions 60. In other words, in terms of visibility, the adjacent first unit pattern 13 and second unit pattern 14 may be spaced apart. In terms of achieving both visibility and the above-described rubber flow property, the adjacent first unit pattern 13 and second unit pattern 14 are preferably connected regularly in a predetermined direction by the connecting portions 60.

In the present embodiment, the plurality of first unit patterns 13 arranged in a direction substantially orthogonal to the tire radial direction B are not continuous via the connecting portions 60, or via the second unit patterns 14 connected by the connecting portions 60.

The plurality of second unit patterns 14 arranged in a direction substantially orthogonal to the tire radial direction B are not continuous via the connecting portions 60, or via the first unit patterns 13 connected by the connecting portions 60. In this way, the air flow during vulcanization molding can be improved, allowing air to escape more efficiently to the outside of each marking element 11. As a result, the rubber flow property during vulcanization molding can be further improved, and the occurrence of defective products can be further suppressed.

Next, details of the second region X2 surrounding the marking elements 11 are explained. In the second region X2, a plurality of ridges 26 are arranged in parallel over the entire second region X2. Specifically, as illustrated at the right side of FIG. 4, the second region X2 includes a base portion 25 and a plurality of ridges 26 projecting from the base portion 25. Although each ridge 26 in this configuration extends in a straight line, the ridges 26 may be configured to extend in a curve (see FIG. 8). By thus arranging the plurality of ridges 26 in the second region X2, the second region X2 can appear brighter at a predetermined viewing angle and a predetermined illumination angle than in the case of the second region X2 being a flat surface. This can emphasize the contrast with the first region X1 in which the marking elements 11 are located. In other words, the visibility of the marking elements 11 can be further enhanced.

Furthermore, the plurality of ridges 26 in the present embodiment extend in parallel. In other words, in the present embodiment, the ridges 26 extend in the same direction regardless of the position around the letters "A" to "G" as the marking elements 11. In this way, the reflection of light in the second region X2 can be made uniform regardless of the placement of the marking elements 11. That is, even if the marking elements 11 are spaced apart, the reflection of light in the second region X2 around each marking element 11 is made uniform. The visibility of the plurality of marking elements 11 that are spaced apart can thereby be prevented from varying. In other words, variation in the visibility among the plurality of first regions X1 that are spaced apart can be suppressed by having the plurality of ridges 26 in the second region X2 extend in parallel.

Figure 7:
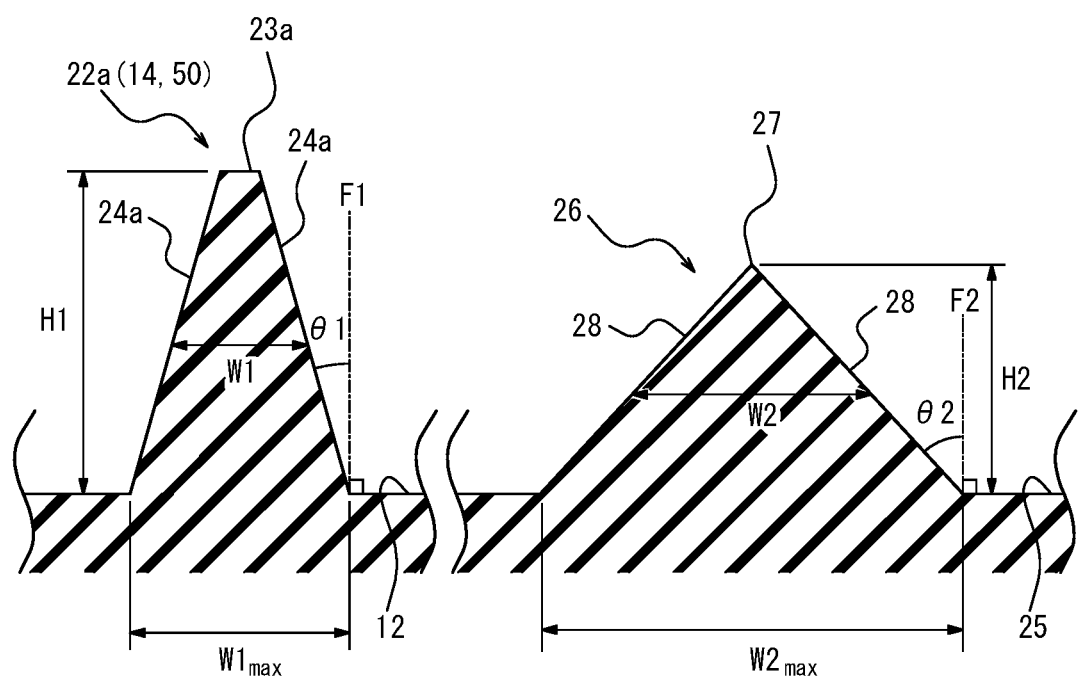
FIG. 7 is a cross-sectional view along cross-section I-I of FIG. 4.

FIG. 7 is a diagram illustrating a cross-section, orthogonal to the extending direction, of the first straight portion 22a of the second unit pattern 14 in the first region X1 and the ridge 26 in the second region X2. Specifically, FIG. 7 is a cross-sectional view along cross-section I-I of FIG. 4. As illustrated in FIG. 7, in the asterisk projection as the second unit pattern 14, the first apex 23a of the first straight portion 22a is formed by a flat apex, as described above (see FIG. 6). In contrast, the cross-sectional shape of the ridge 26 in a cross-section orthogonal to the extending direction is a substantially isosceles triangle, and the apex 27 of the ridge 26 is pointed. As illustrated in FIG. 7, the projection height H1 of the convex portion 50 of the first region X1 is higher than a projection height H2 of the ridge 26 in the second region X2. In this way, the first region X1 can appear darker and contrast more sharply with the second region X2, and the visibility of the first region X1 can be improved. As illustrated in FIG. 7, a maximum width W2max, which is the base length of the ridge 26, is longer than the maximum width W1max of the first straight portion 22a. The apex 27 of the ridge 26 in the present embodiment is configured by a pointed apex, but this configuration is not limiting. In other words, the apex 27 of the ridge 26 may be a flat apex.

At sidewall surfaces 28 of the ridge 26, a width W2, which is the distance between the sidewall surfaces 28, grows wider from the apex 27 side towards the base portion 25 in a cross-sectional view orthogonal to the extending direction of the ridge 26 (see FIG. 7). The sidewall surfaces 28 form an angle θ2 with respect to a virtual vertical plane F2 relative to the base portion 25. The angle θ2 is preferably set to be in a range greater than 30° and equal to or less than 75°, more preferably a range greater than 30° and equal to or less than 60°. When the angle θ2 is 30° or less, a smaller proportion of the reflected light at the sidewall surfaces 28 returns outward from between the ridges 26. In other words, light tends to be reflected less, and the difference in contrast with the first region X1 where the marking elements 11 are located becomes smaller, resulting in less improvement in visibility of the marking elements 11. On the other hand, when the angle θ2 is larger than 75°, the ridges 26 approach a flat surface, yielding a less bright appearance even at a predetermined viewing angle and a predetermined illumination angle. Therefore, to make it easier for reflected light incident between the ridges 26 to return outward from between the ridges 26, and to achieve a particularly bright appearance at a predetermined viewing angle and a predetermined illumination angle, the angle θ2 is preferably greater than 30° and equal to or less than 75°.

Next, the relationship between the first region X1 and second region X2 is explained. The first region X1 and the second region X2 have a relationship such that a minimum separation distance D1 between the apices 50a of the convex portion 50 of the first region X1 is smaller than a minimum separation distance between the apices 27 of two adjacent ridges 26 in the second region X2.

As described above, the convex portion 50 of the first region X1 in the present embodiment includes the first unit pattern 13, the second unit pattern 14, and the connecting portion 60. Here, the minimum separation distance D1 between the apices 50a of the convex portion 50 of the first region X1 in the present embodiment is 0.1 mm to 0.2 mm. Specifically, in the convex portion 50 in the present embodiment, the minimum separation distance D1 described above is achieved at a position where an extended portion of one of the first unit pattern 13 and the second unit pattern 14 penetrates between two extended portions of the other unit pattern. As illustrated at the left side of FIG. 4, an example of the minimum separation distance D1 in the present embodiment is the distance between the apex at the tip of the first extended portion 16a of the first unit pattern 13 and the apex of the third extended portion 21c of the second unit pattern 14. The apex at the tip of the first extended portion 16a of the first unit pattern 13 in the present embodiment is a portion of the flat, first apex 18a of the first straight portion 17a, as illustrated in FIG. 5. The apex of the third extended portion 21c of the second unit pattern 14 is a portion of the flat, second apex 23b of the second straight portion 22b, as illustrated in FIG. 6. In this way, it suffices for the minimum separation distance D1 between the flat apices to be the distance between the closest points of the apices. Although the apex 50a of the convex portion 50 has a flat configuration in the present embodiment, the apex 50a may also have a pointed configuration, such as a ridge formed by intersecting surfaces.

The minimum separation distance D2 between the apices 27 of two adjacent ridges 26 in the second region X2 in the present embodiment is greater than 0.5 mm and equal to or less than 1.5 mm. The apices 27 of the ridges 26 are pointed and not flat in the present embodiment, but the apices 27 may be flat. In a case in which the apices 27 of the ridges 26 are flat, it suffices for the minimum separation distance D2 to be the distance between the closest points of the apices.

In this way, the minimum separation distance D1 between the apices 50a of the convex portion 50 of the first region X1 is smaller than the minimum separation distance D2 between the apices 27 of two adjacent ridges 26 of the second region X2. This configuration can reduce light reflection in the first region X1 as compared to the second region X2. Therefore, the first region X1 appears darker than the second region X2. In contrast, in the second region X2, the plurality of ridges 26 are arranged in parallel. Therefore, the second region X2 appears brighter at a predetermined viewing angle and a predetermined illumination angle than in the case of the second region X2 being a flat surface. This enhances the contrast of light between the adjacent first region X1 and second region X2 at a predetermined viewing angle and a predetermined illumination angle, improving the visibility of one of the first region X1 and the second region X2 relative to the other. This can improve the visibility of a specific region on the outer surface of the tire. In other words, in the present embodiment, the external visibility of the marking elements 11 formed by the first regions X1 can be enhanced.

Furthermore, as illustrated in FIG. 4, in the present embodiment, a minimum separation distance D3 is smaller than the minimum distance D2 between the apices 27 of the two ridges 26 in the second region X2. The minimum separation distance D3 in the present embodiment refers to the minimum separation distance from a standard position SP to the apex of the unit pattern adjacent to a standard unit pattern SU. The standard unit pattern SU refers to any unit pattern in the first region X1 (in the present embodiment, the first unit pattern 13 or the second unit pattern 14), and the standard position SP refers to any position on the apex of the standard unit pattern SU. The minimum separation distance D3 in the present embodiment is 0.5 mm or less. An example of the minimum separation distance D3 is illustrated at the left side of FIG. 4. In a case in which the apices are flat, it suffices for the above-described minimum separation distance D3 to be the distance between close points of the apices.

In this way, by the minimum separation distance D3 in the first region X1 being configured to be smaller than the minimum separation distance D2 in the second region X2, the density of the convex portion 50 in the first region X1 can be made higher than the density of the ridges 26 in the second region X2. This can reduce the area of the base portion 12 of the first region X1 and can reduce the amount of light reflected at the base portion 12 of the first region X1. Therefore, the first region X1 can be made to appear darker, and the contrast of light between the adjacent first region X1 and second region X2 is further second region X2 can be further enhanced relative to the other.

In other words, per unit area, the sum of the extending lengths of the apices 50a of the convex portion 50 in the first region X1 is longer than the sum of the extending lengths of the apices 27 of the ridges 26 in the second region X2. The sum of the extending lengths of the apices 50a of the convex portion 50 in the first region X1 per unit area in the present embodiment is the total length yielded by adding together the sum of the extending lengths of the first apex 18a through the third apex 18c of the first unit pattern 13, the sum of the extending lengths of the first apex 23a through the third apex 23c of the second unit pattern 14, and the extending length of the connecting portion 60. The sum of the extending lengths of the apices 27 of the ridges 26 in the second unit pattern 14 per unit area in the present embodiment is the total length yielded by adding together the extending length of the apex 27 of each ridge 26. In this way, the convex portion 50 of the first region X1 is more densely arranged than the ridges 26 of the second region X2. This can reduce the area of the base portion 12 of the first region X1 and can reduce the amount of light reflected at the base portion 12 of the first region X1. The unit area for comparing the total extending lengths is not particularly limited but can be an area wide enough to include the apices 27 of a plurality of ridges 26, such as a 5 mm square or a 10 mm square.

Also, the maximum width of the base of the extended portions 16, 21 in the first region X1 in the present embodiment is smaller than the minimum width of the base of the ridges 26 in the second region X2. In other words, the extended portions 16, 21 in the present embodiment are narrower than the ridges 26. With this configuration, the first region X1 can be easily filled with unit patterns (in the present embodiment, the first unit pattern 13 and the second unit pattern 14), and the area of the base portion 12 can be reduced. The bases of the extended portions 16, 21 in the present embodiment have a substantially constant width regardless of the position in the extending direction. The bases of the ridges 26 in the present embodiment also have a substantially constant width regardless of the position in the extending direction. In other words, the maximum width of the base of the extended portions 16, 21 in the present embodiment is the "maximum width W1max", illustrated in FIG. 7, and the minimum width of the base of the ridge 26 in the second region X2 in the present embodiment is the "maximum width W2max", illustrated in FIG. 7.

Furthermore, as illustrated at the left side of FIG. 4, a maximum linear length M of the base portion 12 in plan view of the first region X1 is preferably smaller than the above-described minimum separation distance D2 of the second region X2. This can further reduce the light reflected at the base portion 12 of the first region X1.

In this way, the convex portion in the first region X1 is more densely arranged than the ridges 26 in the second region X2, so the first region X1 is more resistant to cracking than the second region X2. Therefore, even if a crack occurs along a ridge 26 in the second region X2, the first region X1 can suppress the progression of the crack. In particular, in the present embodiment, the convex portion 50 arranged in the first region X1 is configured by the non-anisotropic first unit pattern 13 and second unit pattern 14. Therefore, the first region X1 in the present embodiment can suppress the progression of cracks along the extending direction of the ridges 26 of the second region X2, regardless of the extending direction of the ridges 26.

In the present embodiment, the marking element 11 is located in the first region X1, and the location adjacent to the marking element 11 is the second region X2, but this configuration is not limiting. In other words, it suffices for the first region X1 and the second region X2 to be arranged adjacent to each other. The positions of the first region X1 and the second region X2 on the outer surface of the tire and the type of the display represented by the first region X1 and the second region X2 are not particularly limited.

However, if, in a case in which the first region X1 and the second region X2 are provided on the tire side outer surface 32, as in the present embodiment, at least both sides of the first region X1 in the tire circumferential direction C are preferably adjacent to the second region X2. In this way, the visibility of the first region X1 sandwiched by the second region X2 in the tire circumferential direction C can be enhanced. In a case in which the first region X1 is a plurality of marking elements 11 spaced apart in the tire circumferential direction C, as in the present embodiment, the second region X2 is particularly preferably provided on both sides, in the tire circumferential direction C, of each first region X1 representing one of the marking elements 11. This can increase the visibility of each of the marking elements 11 and thus the visibility of the markings 10 as a whole.

Furthermore, in a case in which the first region X1 and the second region X2 are provided on the tire side outer surface 32, as in the present embodiment, the second region X2 is preferably adjacent to at least one side of the first region X1 in the tire radial direction B in addition to both sides of the first region X1 in the tire circumferential direction C. In this way, the visibility of the first region X1 can be further enhanced.

Furthermore, the first region X1 is preferably surrounded by the second region X2, and the first region X1 is preferably adjacent to the second region X2 over the entire perimeter of the first region X1, as in the present embodiment. In this way, the visibility of the first region X1 can be even further enhanced.

Figure 8:
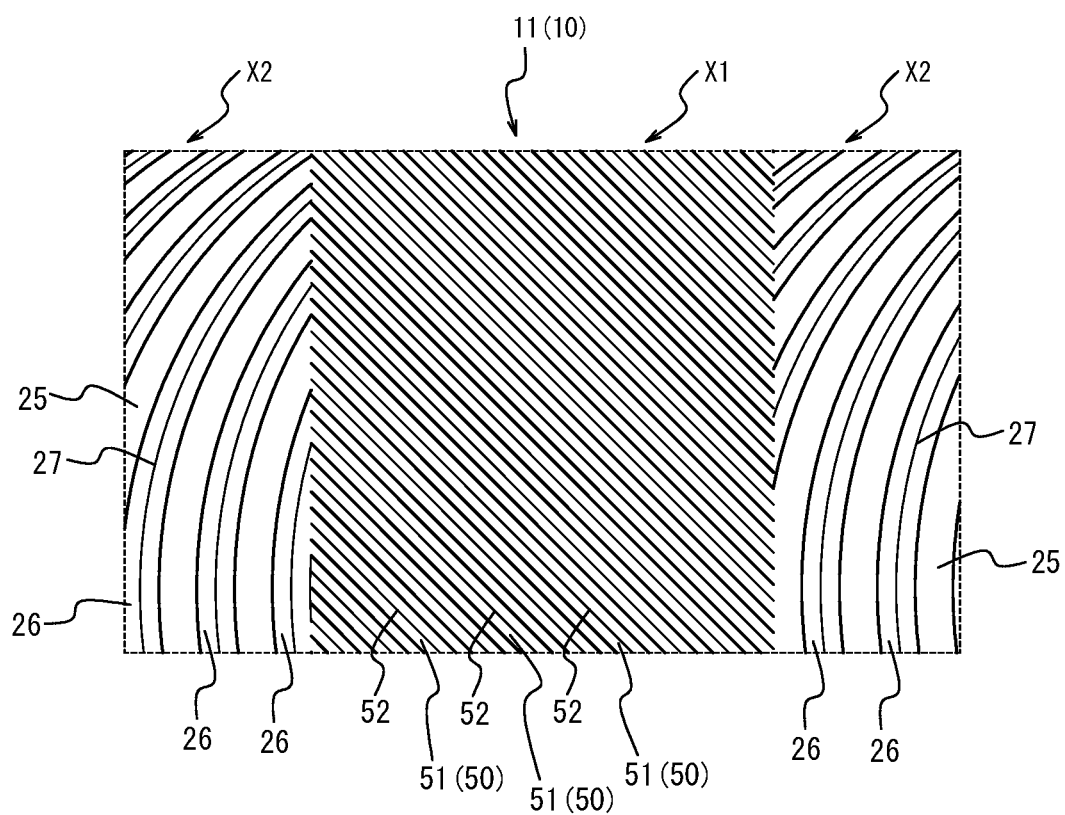
FIG. 8 is a diagram illustrating a variation of a first region and a second region illustrated in FIG. 4.

The tire according to the present disclosure is not limited to the specific configurations described in the above embodiments. Various modifications and changes may be made without departing from the scope of the claims. In the above-described embodiment, the convex portion 50 of the first region X1 includes the first unit pattern 13, the second unit pattern 14, and the connecting portion 60, but this configuration is not limiting. FIG. 8 illustrates a variation of the convex portion 50 of the first region X1 and the ridges 26 of the second region X2. As illustrated in FIG. 8, the convex portion 50 of the first region X1 may be configured by a plurality of ridges 51. The cross-sectional shape in a direction substantially orthogonal to the extending direction of the ridges 51 illustrated in FIG. 8 is an isosceles triangle, and the apex 52 is pointed, but the apex may be flat. In the above-described embodiment, the ridges 26 of the second region X2 are configured to extend in a straight line, but this configuration is not limiting. As illustrated in FIG. 8, the ridges 26 of the second region X2 may extend in a curve.

Figure 9:
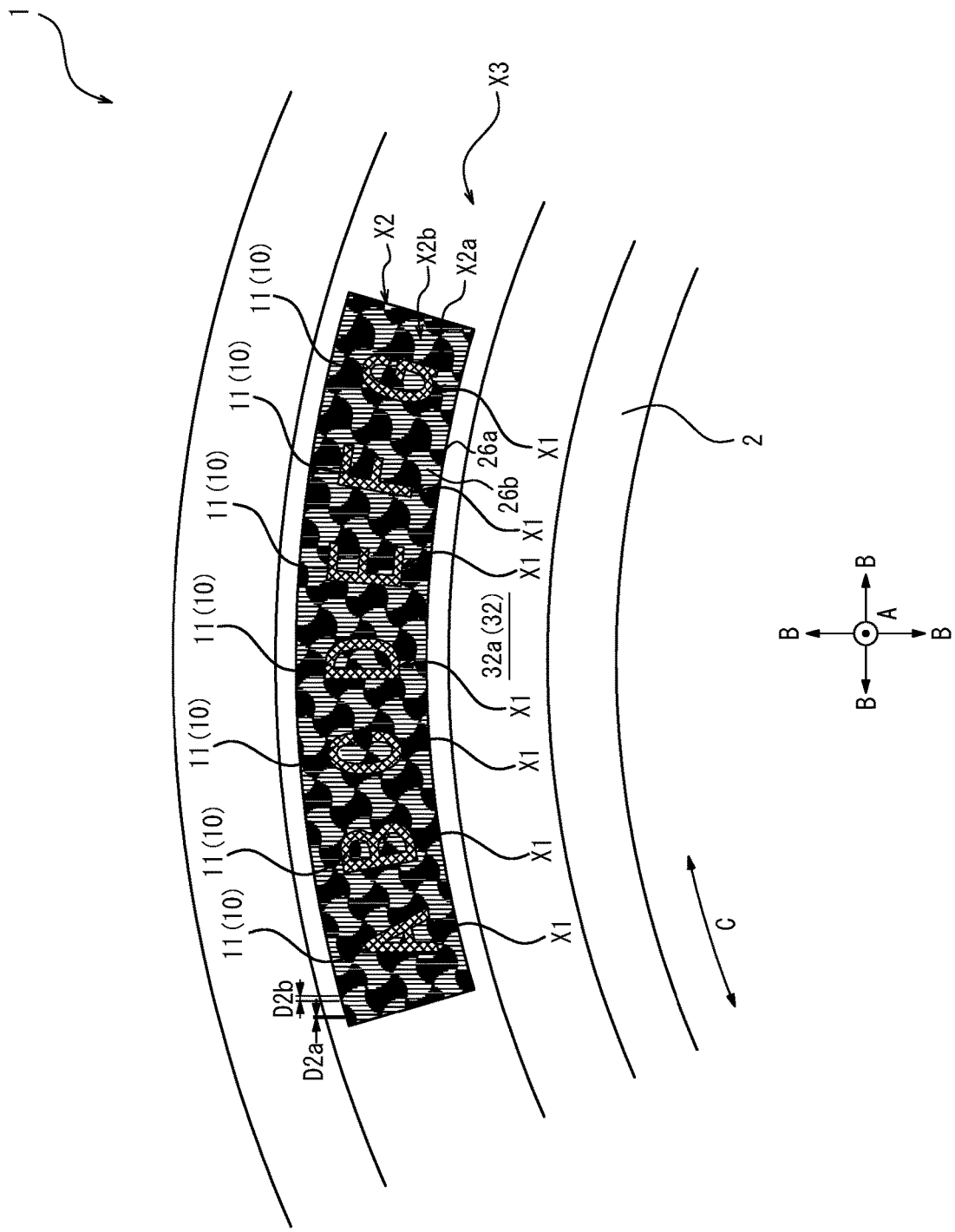
FIG. 9 is a diagram illustrating another variation of the second region illustrated in FIG. 4.

FIG. 9 illustrates a variation of the second region X2. The configurations of the first region X1 and third region X3 illustrated in FIG. 9 are the same as those of the above-described embodiment illustrated in FIGS. 1 to 7. Hence, a description is omitted here.

As in the above-described embodiment, the second region X2 illustrated in FIG. 9 includes an uneven surface formed by a plurality of ridges 26 arranged in parallel throughout the second region X2. However, the second region X2 illustrated in FIG. 9 differs from the second region X2 of the above-described embodiment by including a plurality of types of segmented regions with different separation distances between two adjacent ridges 26.

Specifically, the second region X2 illustrated in FIG. 9 includes two types of segmented regions X2a, X2b as the plurality of types of segmented regions. For the sake of explanation, the two types of segmented regions X2a, X2b are hereinafter distinguished by being referred to as the "first segmented region X2a" and the "second segmented region X2b". The second region X2 illustrated in FIG. 9 includes a plurality of the first segmented regions X2a and a plurality of the second segmented regions X2b arranged adjacent to each other. More specifically, the second region X2 illustrated in FIG. 9 is filled by a plurality of the first segmented regions X2a and a plurality of the second segmented regions X2b.

The first segmented region X2a has a plurality of first ridges 26a arranged in parallel. The second segmented region X2b has a plurality of second ridges 26b arranged in parallel. As illustrated in FIG. 9, the first ridges 26a and the second ridges 26b extend substantially in parallel.

A minimum separation distance D2a between the apices of the two adjacent first ridges 26a in the first segmented region X2a is smaller than a minimum separation distance D2b between the apices of the two adjacent second ridges 26b in the second segmented region X2b. In the example illustrated in FIG. 9, the first ridges 26a and the second ridges 26b extend in a straight line. In the example illustrated in FIG. 9, the plurality of first ridges 26a in the first segmented region X2a are arranged at equal intervals. Furthermore, in the example illustrated in FIG. 9, the plurality of second ridges 26b in the second segmented region X2b are also arranged at equal intervals. Therefore, the above-described minimum separation distance D2a is the separation distance between the apices of two adjacent first ridges 26a in a cross-section orthogonal to the extending direction of the first ridges 26a and is the pitch of the array of first ridges 26a. Also, the above-described minimum separation distance D2b is the separation distance between the apices of two adjacent second ridges 26b in a cross-section orthogonal to the extending direction of the second ridges 26b and is the pitch of the array of second ridges 26b.

In this way, the second region X2 may include a plurality of segmented regions (in the example illustrated in FIG. 9, the first segmented region X2a and the second segmented region X2b) with different separation distances between the ridges 26.

The second region X2 illustrated in FIG. 9 has only two types of segmented regions (the first segmented region X2a and the second segmented region X2b), but three or more types of segmented regions may be included.

In addition, the shape and size of the outer edge outline of the first segmented region X2a and the second segmented region X2b illustrated in FIG. 9 are substantially the same. Specifically, the outer edge outline of the first segmented region X2a and the second segmented region X2b illustrated in FIG. 9 is substantially rectangular.

The two longitudinal sides of the rectangular outer edge outline, however, are concavely curved. The two transverse sides of the rectangular outer edge outline are convexly curved.

The shape and size of the outer edge outline of the first segmented region X2a and the second segmented region X2b may, however, differ. The outer edge outline of the first segmented region X2a and the second segmented region X2b also need not be the above-described rectangular shape.

The minimum separation distance D2a between the two adjacent first ridges 26a in the first segmented region X2a illustrated in FIG. 9 is 0.6 mm, for example, but is not limited to this length. The minimum separation distance D2b between the two adjacent second ridges 26b in the second segmented region X2b illustrated in FIG. 9 is 1.0 mm, for example, but is not limited to this length. The minimum separation distance D2a and the minimum separation distance D2b can, for example, be set appropriately in a range of greater than 0.5 mm and 1.5 mm or less.

The projection height of the first ridges 26a in the first segmented region X2a may be equal to or different from the projection height of the second ridges 26b in the second segmented region X2b. The projection heights of both the first ridges 26a and the second ridges 26b are, however, preferably lower than the projection height H1 of the first region X1 (see FIGS. 5 to 7). The projection height of both the first ridges 26a and the second ridges 26b can, for example, be 0.15 mm.

Another ridge forming a boundary between the plurality of segmented regions in the second region X2 (in the example illustrated in FIG. 9, the first segmented region X2a and the second segmented region X2b) may be provided. In such a case, the projection height of the ridges arranged in parallel in each segmented region (in the example illustrated in FIG. 9, the first ridges 26a and the second ridges 26b) is higher than the above-described ridge forming the boundary, so that the ridges arranged in parallel in each segmented region (in the example illustrated in FIG. 9, the first ridges 26a and the second ridge 26b) form an uneven surface over the entire second region X2. In this way, it suffices for the ridges that are arranged in parallel in each segmented region to cross the ridge that forms the above-described boundary.

FIG. 10 illustrates an example of providing a boundary ridge 70 at the boundary between the first segmented region X2a and the second segmented region X2b of the second region X2 illustrated in FIG. 9. The upper view in FIG. 10 is an enlarged view of a portion of the first segmented region X2a and the second segmented region X2b. The lower view in FIG. 10 is a cross-sectional diagram along the IV-IV line of the upper view in FIG. 10. A projection height H3 of the boundary ridge 70 illustrated in FIG. 10 is higher than projection heights H4, H5 of the first ridges 26a and the second ridges 26b arranged in parallel in the first segmented region X2a and the second segmented region X2b.

INDUSTRIAL APPLICABILITY

The present disclosure relates to a tire.

REFERENCE SIGNS LIST

1 Tire
1a Tread portion
1b Tire side portion
1b1 Sidewall portion
1b2 Bead portion
2 Applicable rim
2a Rim seat portion
2b Rim flange portion
3 Bead member
3a Bead core
3b Bead filler
4 Carcass
4a Ply main body
4b Ply turn-up portion
6 Belt
7 Tread rubber
7a Circumferential groove
8 Side rubber
9 Inner liner
10 Marking
11 Marking element
12 Base portion of first unit pattern
13 First unit pattern (unit pattern)
14 Second unit pattern (unit pattern)
15 Relay point of first unit pattern
16 Extended portion of first unit pattern
16a First extended portion of first unit pattern
16b Second extended portion of first unit pattern
16c Third extended portion of first unit pattern
16d Fourth extended portion of first unit pattern
16e Fifth extended portion of first unit pattern
16f Sixth extended portion of first unit pattern
17a First straight portion of first unit pattern
17b Second straight portion of first unit pattern
17c Third straight portion of first unit pattern
18a First apex of first unit pattern
18b Second apex of first unit pattern
18c Third apex of first unit pattern
19a First sidewall surface of first unit pattern
19b Second sidewall surface of first unit pattern
19c Third sidewall surface of first unit pattern
20 Relay point of second unit pattern
21 Extended portion of second unit pattern
21a First extended portion of second unit pattern
21b Second extended portion of second unit pattern
21c Third extended portion of second unit pattern
21d Fourth extended portion of second unit pattern
21e Fifth extended portion of second unit pattern
21f Sixth extended portion of second unit pattern
22a First straight portion of second unit pattern
22b Second straight portion of second unit pattern
22c Third straight portion of second unit pattern
23a First apex of second unit pattern
23b Second apex of second unit pattern
23c Third apex of second unit pattern
24a First sidewall surface of second unit pattern
24b Second sidewall surface of second unit pattern
24c Third sidewall surface of second unit pattern
25 Base portion of second unit pattern
26 Ridge
26a First ridge
26b Second ridge
27 Apex of ridge
28 Sidewall surface of ridge
31 Tread outer surface
32 Tire side outer surface
32a Sidewall outer surface
32b Bead outer surface
50 Convex portion
50a Apex of convex portion
51 Ridge
52 Apex of ridge
60 Connecting portion
70 Boundary ridge
A Tire width direction
B Tire radial direction
C Tire circumferential direction
CL Tire equatorial plane
D1 Minimum separation distance between apices of convex portion of first region
D2 Minimum separation distance between apices of ridges of second region
D2a Minimum separation distance between apices of first ridges of first segmented region of second region
D2b Minimum separation distance between apices of second ridges of second segmented region of second region
D3 Minimum separation distance from standard position of first region to apex of unit pattern adjacent to standard unit pattern
F1 Virtual vertical plane relative to the base portion of first region
F2 Virtual vertical plane relative to the base portion of second region
H1 Projection height of straight portion of first region H2 Projection height of ridge of second region
H3 Projection height of boundary ridge of second region
H4 Projection height of first ridge of first segmented region of second region
H5 Projection height of second ridge of second segmented region of second region
L Linear extending length
M Maximum linear length of base portion of first region
O Tire central axis
O1 Center point of first unit pattern
O2 Center point of second unit pattern
W1 Width of straight portion of first region
W2 Width of ridge of second region
P Interval between center points of first unit pattern and second unit pattern
SP Standard position
SU Standard unit pattern
TE Tread edge
X1 First region
X2 Second region
X2a First segmented region
X2b Second segmented region
X3 Third region
θ1 Angle with respect to virtual vertical plane relative to base portion of first region
θ2 Angle with respect to virtual vertical plane relative to base portion of second region

The invention claimed is:

1. A tire comprising:
on a tire outer surface,
   a first region comprising an uneven surface formed by a convex portion arranged throughout the first region; and
   a second region comprising an uneven surface formed by a plurality of ridges arranged throughout the second region, the second region being arranged adjacent to the first region, wherein
the second region includes:
   a first segmented region having a plurality of first ridges arranged in parallel;
   a second segmented region having a plurality of second ridges arranged in parallel; and
   a boundary ridge projecting at a boundary between the first segmented region and the second segmented region,
a minimum separation distance between apices of two adjacent first ridges of the plurality of the first ridges in the first segmented region is smaller than a minimum separation distance between apices of two adjacent second ridges of the plurality of the second ridges in the second segmented region,
a minimum separation distance between apices of the convex portion in the first region is shorter than the minimum separation distance between the apices of the two adjacent first ridges of the plurality of the first ridges in the first segmented region,
the plurality of the first ridges in the first segmented region and the plurality of the second ridges in the second segmented region are arranged in parallel, and
a projection height of the boundary ridge is higher or lower than a projection height of the ridges arranged in each of the first segmented region and the second segmented region.

2. The tire according to claim 1, wherein
the first region and the second region are provided on an outer surface of a tire side portion of the tire outer surface, and
at least both sides of the first region in a tire circumferential direction are adjacent to the second region.

3. The tire according to claim 2, wherein at least one side of the first region in a tire radial direction is adjacent to the second region.

4. The tire according to claim 3, wherein
the first region is surrounded by the second region, and
the first region is adjacent to the second region over an entire perimeter of the first region.

5. The tire according to claim 1, wherein the convex portion in the first region includes a first projection and a plurality of second projections adjacent to the first projection,
   each of the first and second projections comprises a relay point and a plurality of extended portions extending in different directions from the relay point in plan view,
   at any position on an apex of the first projection, a minimum separation distance therefrom to apices of the second projections is shorter than the minimum separation distance between the apices of the two adjacent first ridges of the plurality of the first ridges in the first segmented region.

6. The tire according to claim 5, wherein a projection height of the plurality of extended portions in the first region is higher than the projection height of the ridges arranged in each of the first segmented region and the second segmented region, and
   the projection height of the plurality of extended portions in the first region is higher than the projection height of the boundary ridge.

7. The tire according to claim 5, wherein at any position on the apex of the first projection, the minimum separation distance therefrom to the apices of the second projections is 0.5 mm or less.

8. The tire according to claim 5, wherein a maximum width of a base of the extended portions in the first region is smaller than a minimum width of a base of the ridges in each of the first segmented region and the second segmented region.

9. The tire according to claim 5, wherein
   in each of the first and second projections, the apex extends across the relay point and the plurality of extended portions.

* * * * *